July 27, 1948.  H. D. POLIE  2,445,968
TRANSMISSION
Filed Aug. 16, 1944  3 Sheets-Sheet 1
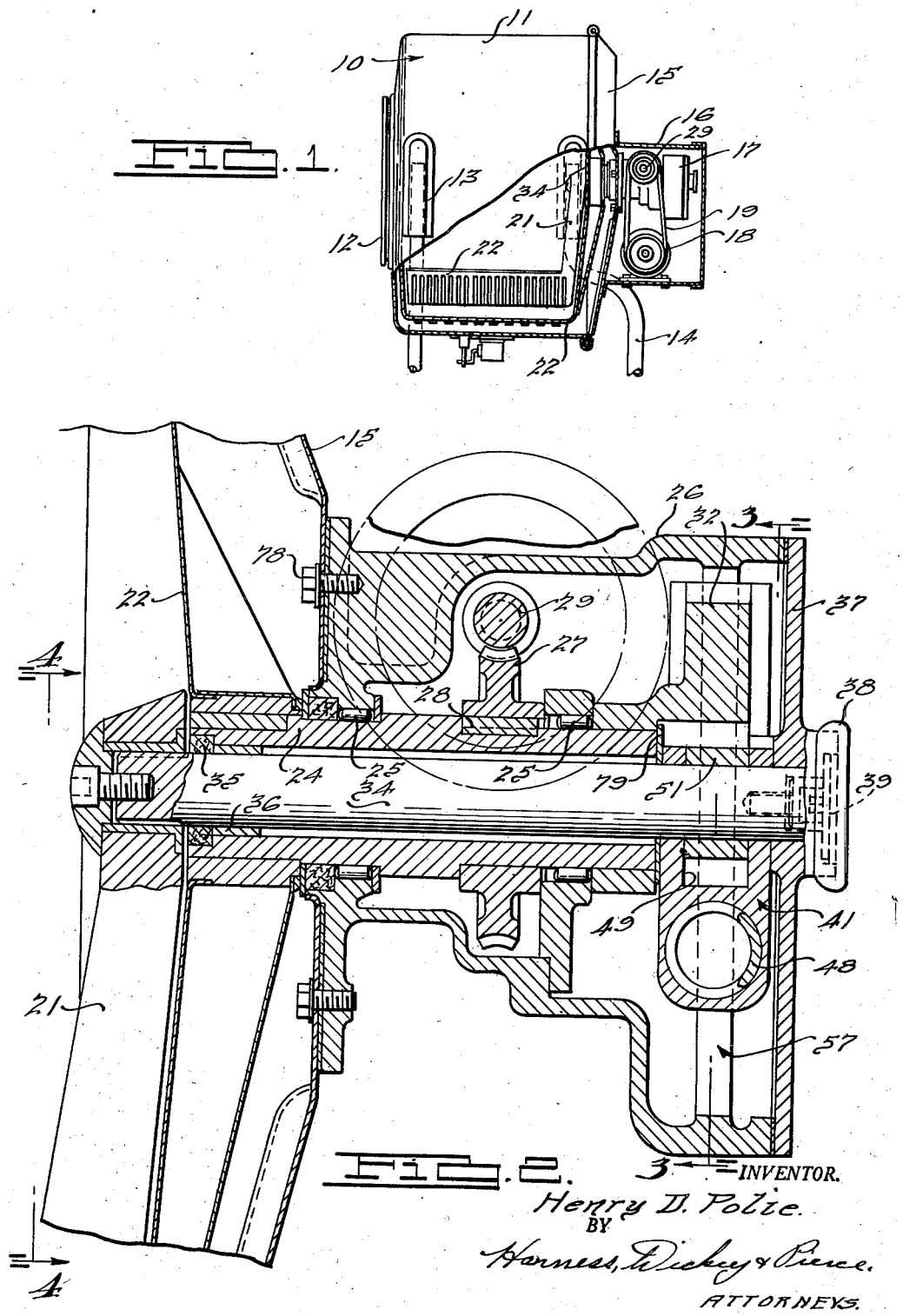
INVENTOR.
Henry D. Polie.
BY
Harness, Dickey & Pierce.
ATTORNEYS.

July 27, 1948. H. D. POLIE 2,445,968
TRANSMISSION
Filed Aug. 16, 1944 3 Sheets-Sheet 2

INVENTOR.
Henry D. Polie.
BY
Harness, Dickey & Pierce
ATTORNEYS.

July 27, 1948.   H. D. POLIE   2,445,968
TRANSMISSION
Filed Aug. 16, 1944   3 Sheets-Sheet 3

INVENTOR.
Henry D. Polie.
BY
Harness, Dickey & Pierce
ATTORNEYS.

Patented July 27, 1948

2,445,968

UNITED STATES PATENT OFFICE 2,445,968

TRANSMISSION

Henry D. Polie, Detroit, Mich., assignor to The Murray Corporation of America, Detroit, Mich., a corporation of Delaware Application August 16, 1944, Serial No. 549,689

11 Claims. (Cl. 74—68)

This invention relates to transmissions and particularly to a new and novel transmission which produces an oscillating movement between two members rotated in unison with each other.

The transmission may be employed on a washing machine such as that disclosed in the G. E. Ehrling application, Serial No. 507,532, filed October 25, 1943, now Patent 2,431,925, issued December 2, 1947, and assigned to the assignee of the present invention. The washing machine of the co-pending application comprises a tub supported on suitable standards with its axis disposed horizontally and in which a rotor is mounted to be driven in rotation on a horizontal axis at a constant speed. Within the rotor a squeeze bar is mounted for rotation with the rotor and for oscillatory movement relative to a shoulder projecting from the peripheral wall of the rotor.

The transmission rotates the rotor and the squeeze bar and produces an oscillatory movement of the squeeze bar to and from the shoulder and applies a pressure between the bar and shoulder for squeezing the clothes therebetween. The oscillation occurs once or any number of times for each revolution of the rotor, and in the structure herein illustrated a single oscillation of the squeeze bar occurs relative to the shoulder during a single rotation of the rotor. While the transmission has many applications, its use for driving the washing machine will be described herein in detail by way of example only.

The transmission embodies a housing containing a hollow shaft for supporting and driving the rotor and a shaft internally thereof for supporting and operating a squeeze bar. A worm and worm wheel drive the rotor shaft from a suitable motor and the rotor and squeeze bar shaft are interconnected by a pressure-applying toggle mechanism of unique construction. This embodies an arm secured to the rotor shaft, a bell crank secured to the squeeze bar shaft, an arm pivoted on the squeeze bar shaft, and a pair of toggle links interconnecting the arms. A roller is provided on the toggle links which engages a cam track of predetermined form.

A pair of springs having different pressure-exerting characteristics interconnects the arms of the bell cranks to the two arms actuated by the toggle mechanism which is secured thereto. When the rotor shaft is driven, the arm on the shaft carries the toggle mechanism therewith which advances the bell crank and pivoted arm and spring therewith to have the squeeze bar shaft all rotate as a unit. The squeeze bar is positioned a predetermined distance from the shoulder of the rotor by the longer, weaker spring which extends between the rotor shaft arm and one arm of the bell crank. As the roller advances along the dwell portion of the cam track, no oscillation occurs between the squeeze bar and shoulder. As soon, however, as the roller reaches the portion of the cam track inwardly of the dwell, the toggle arms are deflected against the springs to first collapse the weaker and longer spring between the arm on the rotor shaft and that of the bell crank to advance the squeeze bar against the shoulder of the rotor or the clothes disposed therebetween. After this occurs, the roller passes over another portion of the cam surface which further deflects the toggle links and, since no further movement can be applied between the squeeze bar and shoulder, the heavier spring between the pivoted arm and the bell crank is deflected to exert a substantial pressure between the squeeze bar and shoulder and on the clothes therebetween. The mechanical advantage of the mechanism and the calibration of the spring produces a pressure of several hundred pounds between the shoulder and squeeze bar and may be varied by changing the effective lengths of the arms, bell crank, and links, as well as the springs.

Thereafter the roller moves along a relieved portion of the cam and along the dwell to relieve and then retract the toggle links which releases the pressure on the bar and clothes and moves the bar away from the shoulder. If more than one oscillation for each rotation is desired, other cam surfaces may be provided at other points of the cam track to produce the additional number of oscillations for a single rotation.

Accordingly, the main objects of this invention are; to provide a transmission for driving a pair of shafts in rotation and producing relative oscillation therebetween; to provide a transmission for rotating the shafts of a rotor and squeeze bar and oscillating the squeeze bar within the rotor through the operation of lever arms and links actuated by a roller moving upon a cam track; to provide a transmission having an outer driving shaft and an inner driven shaft with an arm on the driving shaft which is connected with the arm on the inner shaft through a spring, which inner shaft is connected through another arm and spring to a pivoted arm joined to the pivoted arm on the outer shaft through a pair of toggle links; to produce the rotation of a rotor and squeeze bar and a relative oscillation therebetween while applying pressure between the squeeze bar and a shoulder within the rotor by the operation of the motor driving the rotor shaft in rotation which operates through a pair of toggle links following a cam track for advancing the squeeze bar against the shoulder and for thereafter applying a pressure therebetween; and in general to provide a transmission having only one set of gear elements for producing the rotation and the relative oscillation between a pair of telescoped shafts, all of which is simple in construction, positive in operation, and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken sectional view of a washing machine having a transmission embodying features of this invention;

Fig. 2 is an enlarged sectional view of the transmission illustrated in Fig. 1;

Fig. 5 is a view of structure, similar to that illustrated in Fig. 3, showing a further form which the invention may assume.

Figure 3:
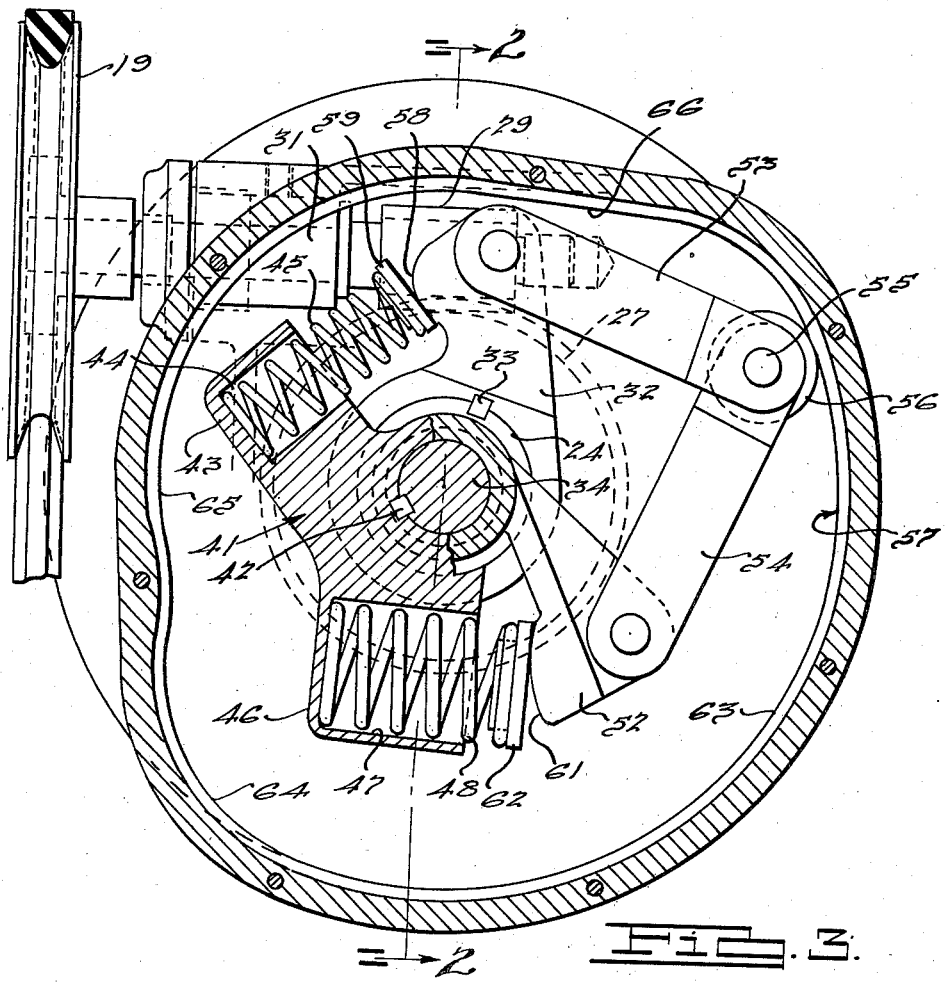
Fig. 3 is a sectional view of the structure illustrated in Fig. 2, taken on the line 3—3 thereof.

Referring to Figs. 1 to 4 inclusive, a washing machine 10 is illustrated embodying a tub 11 of cylindrical form having its axis disposed horizontally and provided with a front opening enclosed by a hinged door 12. Stirrups 13 are provided on the sides of the tub in which the ends of a pipe frame 14 project to form the support for the entire washing machine. The rear wall 15 which encloses the open end of the tub 11 supports a removable casing 16 which encloses a transmission 17 driven by a motor 18 through a belt and pulley connection 19. As described in the above-mentioned co-pending application, the tub 11 contains a rotor 22 and a squeeze bar 21, both of which are driven in rotation by the transmission 17 and relatively oscillated to produce a squeezing action on the clothes which are tumbled therebetween by the rotation of the rotor.

Figure 4:
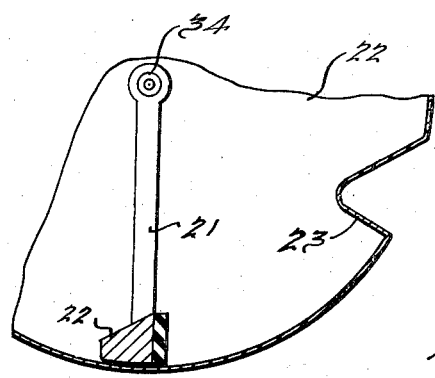
Fig. 4 is a reduced view of the structure illustrated in Fig. 2, as viewed from the line 4—4 thereof.
Figure 3:
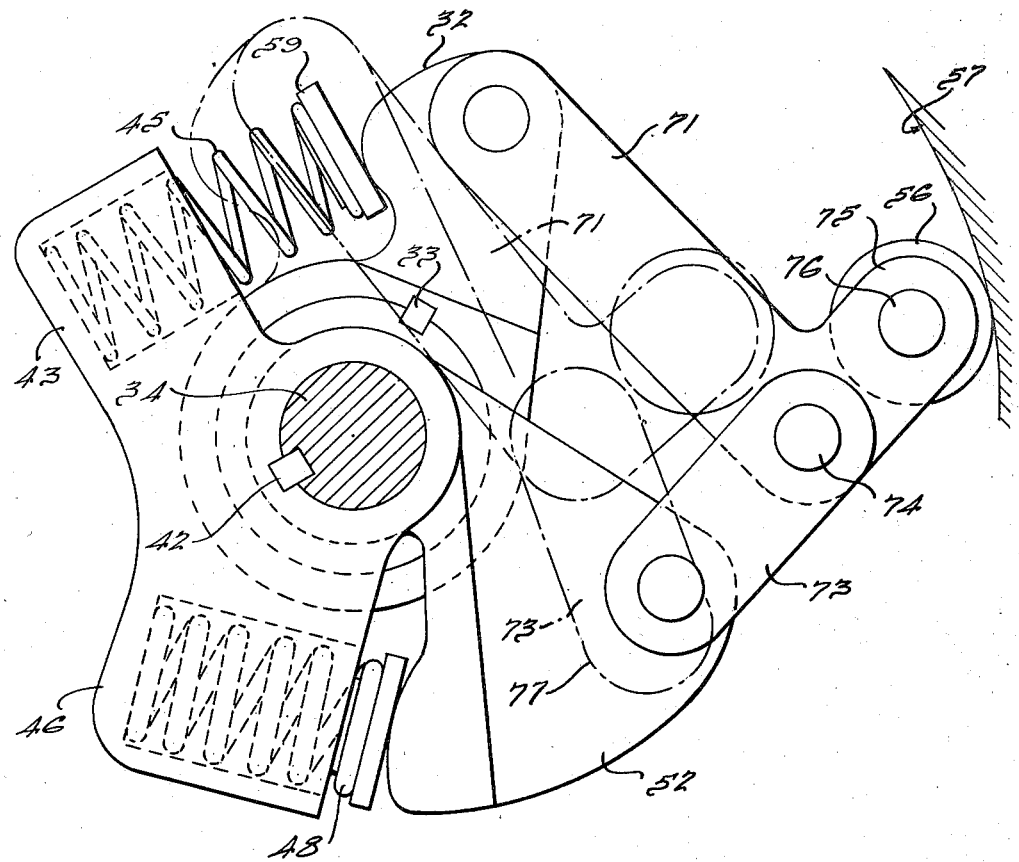

The present invention pertains to the transmission 17 which drives the rotor and squeeze bar in rotation and produces the relative oscillation therebetween which applies pressure between the squeeze bar and a shoulder 23 on the peripheral wall of the rotor, as illustrated in Fig. 4. The rotor 22 has its end wall supported on a hollow shaft 24 which is mounted on bearings 25 supported within a housing 26. A worm wheel 27 is secured to the shaft 24 by a key 28 and is driven by a worm 29 supported in a bearing 31 within the housing 26 and driven through the pulley and belt connection 19 by the motor 18. An arm 32 is secured to the shaft 24 by a key 33.

The squeeze bar 21 is mounted on a shaft 34 and sealed against the passage of water from the tub by the sealing element 35. The shaft is supported on a bearing 36 at one end and on the cover 37 of the housing 26 at the other end. A thrust bearing element is secured to the end of the shaft 34 by a screw 39. The shaft has a bell crank 41 secured thereto by a key 42 having in one arm 43 thereof an aperture 44 in which a spring 45 is secured. The opposite arm 46 of the bell crank 41 has an aperture 47 in which a much heavier spring 48 is supported.

A slot 49 is provided through the bearing of the bell crank 41 in which the end 61 of an arm 52 is disposed when journaled on the shaft 34 for pivotal movement thereon. The arms 32 and 52 are interconnected by a pair of toggle links 53 and 54 which are pivoted thereto and are joined in pivotal relation on a pin 55 on which a roller 56 is pivotally mounted. The roller engages a cam track 57 on which it rides as the shaft 24 is driven to produce the movement of the toggle links 53 and 54 toward and from the axes of the shafts.

An arcuate nose 58 is provided on the arm 32 which rolls and slides over a plate 59 supported on the end of the spring 45. A similar arcuate nose 51 is provided on the arm 52 in engagement with a plate 62 carried on the end of the spring 48. In the position illustrated in Fig. 3, the roller 56 is in engagement with the dwell portion 63 of the cam track 57, in which position the squeeze bar 21 is separated from the shoulder 23 on the periphery of the rotor. As the shafts rotate in unison, the clothes within the rotor will be tumbled independent of any action thereon by the squeeze bar and shoulder. As the roller 56 approaches the cam surface portion 64, the roller will move inwardly toward the axes of the shafts, spreading the toggle links 53 and 54, which will cause a relative movement between the bell crank arm 44 on the squeeze bar shaft 34 and the rotor shaft 24. This will result from the relative advancement of the link 54, arm 52, and bell crank 41 toward the link 32 as the spring 45 collapses as it withstands less pressure than the spring 48. This movement advances the squeeze bar toward the shoulder 23 to pick up and hold any of the clothes which are tumbled therebetween during the cycle of operation over the dwell portion 63 at the cam track 57.

A further movement of the roller 56 advances the roller over the cam track portion 65 which further moves the roller toward the axes of the shafts. As the squeeze bar can no longer be moved except under greater pressure, the spring 48 will then be deflected and will apply a slightly further movement between the bar and shoulder under a substantial load which will force the water through the clothes. As the shaft 24 continues to advance, the wheel 56 passes along a cam track portion 66 which permits the roller to move away from the center of the shafts 24 and 34 until it again rolls upon the dwell portion 63.

As the roller passes across the cam portion 66, the toggle links 53 and 54 move away from the axes of the shafts and first release the pressure on the spring 48 and thereafter permit the spring 45 to expand, which moves the squeeze bar 21 away from the shoulder 23 to thereby release the clothes which were squeezed therebetween during the operation. During each rotation of the shafts 24 and 34, a squeezing operation is performed between the squeeze bar 21 and the shoulder 23 on the clothes caught therebetween during the tumbling operation. The clothes which are squeezed are thereafter released to permit them to tumble along with the other clothes across the rotor in the manner outlined in the above-mentioned co-pending application.

As pointed out hereinabove, additional cam portions 64, 65, and 66 can be added to the cam track 57 to provide an additional number of squeezing operations for each rotation of the rotor. It is to be understood that the cam track may be changed to any desirable form to lengthen or shorten the period of dwell or the period during which the maximum pressure is applied between the squeeze bar and the shoulder upon the clothes disposed therebetween.

Referring to Fig. 5, a further form of the invention is illustrated, that wherein the toggle links 53 and 54 are slightly modified to produce a bell crank link 71 and a link 73 pivoted thereto on the pivot 74. The arm 75 of the link 71 supports the roller 56 on a pin 76 for rolling movement along the cam track 57. The opposite ends of the bell crank 71 and link 73 are pivoted to the arms 32 and 52 in the manner pointed out hereinabove. The maximum pressure is exerted upon the spring 48 when the bell crank 71 and the link 73 are in substantially a straight-lined position, as illustrated in dot and dash line at 77. This provides the maximum application of force to the spring 48 without overloading the roller 56 and the cam track 57. Otherwise the structure of Fig. 5 is the same as the structure illustrated in Figs. 1 to 4 inclusive.

It will be noted that the housing 26 is supported on the removable wall 15 of the tub by a series of screws 78 so that when the wall 15 is removed the transmission, motor, controls, rotor, and squeeze bar are removed as a unit. These may be returned to the shop for repair and a new unit substituted therefor so that the machine may be retained in operation until repairs have been made. It will be noted further that a thrust washer 79 is disposed between the end of the rotor shaft 24 and the bell crank 41 to prevent engagement therebetween and to assist in the sealing of the shaft 34 relative to the shaft 24.

What is claimed is:

1. A transmission including, in combination, a housing, an external and an internal shaft supported by the housing for rotation, means for driving said external shaft in rotation, mechanism interconnecting the shafts, means for shifting said mechanism to produce the rotation of the internal shaft with and relative to the external shaft, and means for applying a pressure between said shafts while reducing the relative rotation therebetween through the further shifting of said mechanism.

2. A transmission including, in combination, a housing, an external and an internal shaft supported by the housing for rotation, means for driving one of said shafts in rotation, a rotor supported by said external shaft having a shoulder, an element supported by said internal shaft within said rotor for movement to and from said shoulder when the shafts are relatively rotated, mechanism interconnecting the shafts, means for shifting said mechanism to produce the rotation of both of the shafts with and relative to each other by the driving of said one shaft for producing movement between said element and shoulder, and means permitting a variation in the relative movement between the element and shoulder independent of the continued shifting of said mechanism.

3. A transmission, including, in combination, a housing, an external and an internal shaft supported by the housing for rotation, means for driving one of said shafts in rotation, mechanism interconnecting the shafts, means for shifting said mechanism to produce the rotation of both of the shafts with and relative to each other by the driving of said one shaft, and means for establishing a pressure between said shafts through the further operation of said mechanism by the further driving of said one shaft when the relative rotation of said shafts is resisted.

4. A transmission including, in combination, a housing, an external and an internal shaft supported by the housing for rotation, a rotor supported on said external shaft, an element within said rotor supported on said internal shaft, means for driving one of said shafts in rotation, mechanism interconnecting the shafts, means for shifting said mechanism to produce the rotation of both of the shafts, the rotor and element with and relative to each other by the driving of said one shaft, and means for applying a pressure between said rotor and element while reducing the relative rotation therebetween as the mechanism is further shifted.

5. A transmission including, in combination, an external and internal shaft disposed in telescoped relation, means for driving said external shaft, a housing for supporting said shafts, a cam track in said housing, mechanism interconnecting said shafts, a pair of toggle links interconnecting said mechanism, means on said toggle links in engagement with said track for operating said mechanism and said shafts relative to each other, and means for applying a pressure between said shafts when the relative rotation thereof is reduced and said mechanism is further operated.

6. A transmission including, in combination, a housing, an external and internal shaft journaled in said housing for rotation, means for driving said external shaft, an arm on said external shaft, a bell crank secured to said internal shaft, an arm journaled for rotation on said internal shaft, a pair of toggle links having their ends pivoted to said arms, a roller pivoted on the toggle links, a cam track within said housing with which said roller engages, and springs disposed between said arms and bell crank for producing a relative rotation between said shafts and for applying a predetermined pressure therebetween through the operation of said toggle links produced by the rotation of the roller over said cam track.

7. A transmission including, in combination, a housing, an external and internal shaft journaled in said housing for rotation, means for driving said external shaft, an arm on said external shaft, a bell crank secured to said internal shaft, an arm journaled for rotation on said internal shaft, a pair of toggle links having their ends pivoted to said arms, a roller pivoted on the toggle links, a cam track within said housing with which said roller engages, and springs disposed between said arms and bell crank for producing a relative rotation between said shafts and for applying a predetermined pressure therebetween through the operation of said toggle links produced by the rotation of the roller over said cam track, the further movement of the roller over the cam track permitting a change of position of the toggle links to release said pressure and to return the shafts to their original position relative to each other.

8. In a transmission, a housing, external and internal telescoped shafts disposed within said housing, means for driving said external shaft in rotation, an arm on said external shaft, a bell crank on said internal shaft, an arm journaled on said internal shaft, a pair of springs having different pressure characteristics disposed between the bell crank and said arms, and a toggle mechanism interconnecting said arms for producing movement of the shafts with and relative to each other.

9. In a transmission, a housing, external and internal telescoped shafts disposed within said housing, means for driving said external shaft in rotation, an arm on said external shaft, a bell crank on said internal shaft, an arm journaled on said internal shaft, a pair of springs having different pressure characteristics disposed between the bell crank and said arms, a toggle mechanism interconnecting said arms for producing movement of the shafts with and relative to each other, a cam track within the housing, and a roller associated with said toggle mechanism for changing its position.

10. In a transmission, a housing, external and internal telescoped shafts disposed within said housing, means for driving said external shaft in rotation, an arm on said external shaft, a bell crank on said internal shaft, an arm journaled on said internal shaft, a pair of springs having different pressure characteristics disposed between the bell crank and said arms, a toggle mechanism interconnecting said arms for producing movement of the shafts with and relative to each other, a cam track within the housing, a roller associated with said toggle mechanism for changing its position, said cam track having a dwell portion in which the shafts are driven in unison, a cam portion which produces the rotation of the shafts relative to each other, and a further cam portion for applying a pressure between the two shafts after they have been rotated to a desired related position.

11. In a transmission, a housing, external and internal telescoped shafts disposed within said housing, means for driving said external shaft in rotation, an arm on said external shaft, a bell crank on said internal shaft, an arm journaled on said internal shaft, a pair of springs having different pressure characteristics disposed between the bell crank and said arms, a toggle mechanism interconnecting said arms for producing movement of the shafts with and relative to each other, a cam track within the housing, a roller associated with said toggle mechanism for changing its position, said cam track having a dwell portion in which the shafts are driven in unison, a cam portion which produces the rotation of the shafts relative to each other, a further cam portion for applying a pressure between the two shafts after they have been rotated to a desired related position, and a further cam portion for releasing the pressure and for permitting the shafts to rotate to their initial relative positions.

HENRY D. POLIE.

REFERENCES CITED

The following references are of record in the file of this patent:

UNITED STATES PATENTS

| Number | Name | Date |
|---|---|---|
| 2,336,361 | Lear | Dec. 7, 1943 |

FOREIGN PATENTS

| Number | Country | Date |
|---|---|---|
| 480,115 | France | Mar. 24, 1916 |